April 14, 1964     E. E. BAUMAN ETAL     3,128,950
ILLUMINATIVE TELEPHONE DIAL
Filed Jan. 4, 1960     2 Sheets—Sheet 1
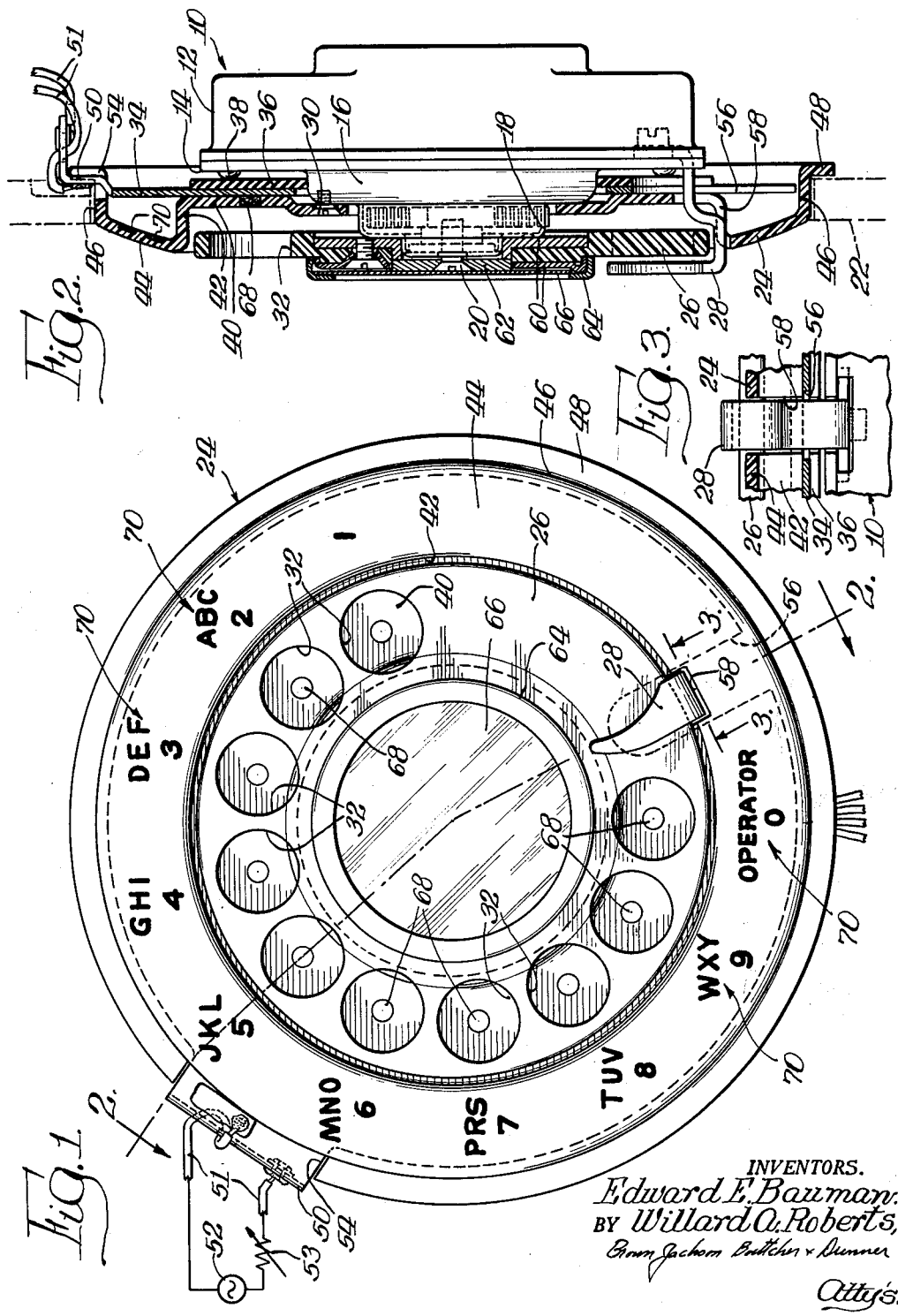
INVENTORS.
Edward E. Bauman,
BY Willard O. Roberts,
Brown Jackson Boettcher & Dienner
Attys.

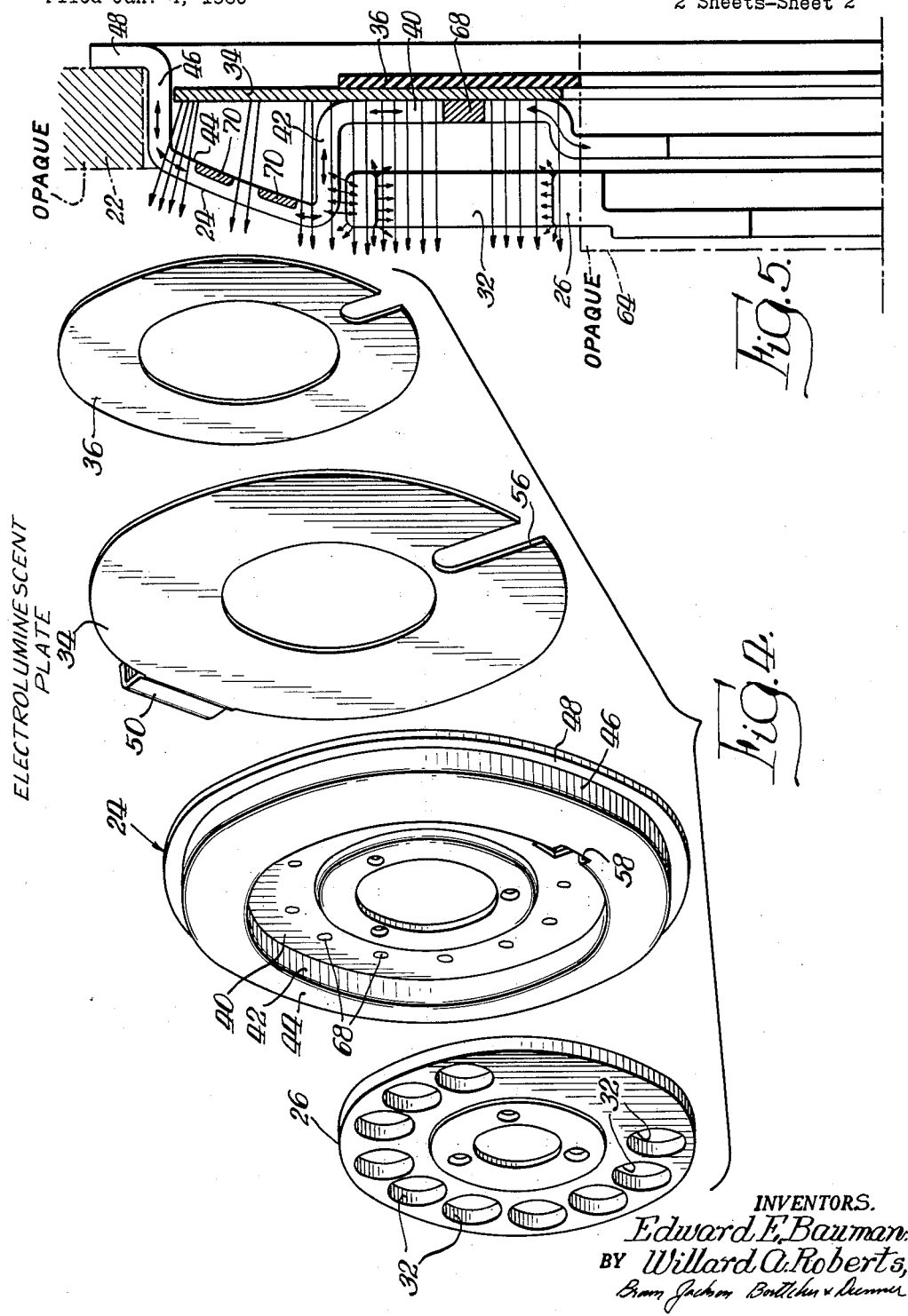

United States Patent Office 3,128,950
Patented Apr. 14, 1964

3,128,950
ILLUMINATIVE TELEPHONE DIAL
Edward E. Bauman and Willard A. Roberts, Galion, Ohio, assignors to North Electric Company, Galion, Ohio, a corporation of Ohio
Filed Jan. 4, 1960, Ser. No. 194
4 Claims. (Cl. 240—2.1)

The present invention relates to illuminative dials for telephones and the like, and particularly, to improved illuminative dials utilizing as the light source an electroluminescent plate.

Electroluminescent plates, or luminous capacitors as they are sometimes called, are light-emitting devices made after the manner of a flat-plate capacitor, except that one of the plates is made of a transport conducting material and the space between the plates is occupied by a thin layer of dielectric material in which a phosphor is suspended. When the device is energized by an alternating current, the phosphor emits light which is visible through the transparent conducting layer. In its completed form, the luminous cell is a flat-plate no more than about 1/32 of an inch thick having a long service life and low power requirement, and producing negligible heat. Consequently, it is an ideal medium for illuminating dials, especially in instruments wherein severe space or volume restrictions are imposed, and proposals have been made for such use of the plates or cells.

The object of the present invention is to provide an improved dial structure embodying an electroluminescent plate and so constructed as to provide for optimum illumination of the dial, including the indicia and the indicator or indicators; in the case of telephone dials, at least the numbers and letters and the holes in the finger wheel, and preferably the entire finger wheel and the finger stop as well.

It is a particular object of the invention to provide an improved illuminative dial consisting essentially of three superimposed elements, namely, an electroluminescent plate, an indicia member covering the luminescent surface of the plate, and a movable indicator (which in a telephone dial would comprise the finger wheel) associated with the indicia member.

It is also an object of the invention to provide an improved illuminative dail as above described wherein the portion of the indicia member underlying the indicator is essentially translucent and diffuses the light passing therethrough from the plate so that said portion effectively glows, whereby the indicator is outlined thereon by virtue of the illuminative glow.

It is a further object of the invention to provide an improved illuminative dial as above described wherein the indicia member includes the said essentially translucent portion and an indicia-bearing portion adjacent said translucent portion which is of contrasting opaque and translucent character and is illuminated by the light emanating from the plate to reveal the indicia thereon, the indicator overlying said essentially translucent portion to be outlined thereon and extending adjacent said indicia-bearing portion.

Another object of the invention is to provide an improved illuminative dial as above described wherein the indicator is transparent to reveal therethrough the illuminative glow of said translucent portion of the indicia member, and yet have its edges relatively starkly outlined over this glowing background. Depending upon the angle of incidence of the viewer, the edge surfaces of a transparent indicator may appear to sparkle, as though being edge-lighted, and/or may appear to be shaded, whereby the same are clearly defined on the glowing background provided by the illuminated translucent portion of the indicia member. In a telephone dial, the resultant effect is very pleasing aesthetically as the illuminative glow of said translucent portion is not diminished by the transparent wheel and the wheel appears to be of the same color as the said portion, yet each finger hole in the wheel is clearly outlined by virtue of apparent edge-lighting and/or shading of the marginal edges of the wheel bounding each hole.

A further object of the invention is the provision of an improved illuminative dial including an indicia member formed of translucent insulating material and constructed to constitute an insulated housing for the electroluminescent plate, and also preferably constructed to constitute a protective housing for the indicator.

A still further object of the invention is the provision of an improved illuminative dial including an indicia member formed of translucent insulating material and comprising a flat, essentially translucent, internal portion adapted to engage flush against the electroluminescent plate and adapted to have the indicator or finger wheel disposed thereabove, an upstanding wall bounding said flat portion and forming a depression for reception of the indicator or finger wheel, a primary indicia-bearing portion or flange extending outwardly from the upper edge of said wall and disposed substantially flush at least at its inner edge with the indicator or finger wheel, and preferably also disposed at least at its outer edge substantially flush with the exterior surface of the instrument housing, said indicia-bearing portion being adapted to carry opaque matter for defining indicia thereon, a second wall extending from the outer edge of said indicia-bearing portion downwardly beyond the plane of said flat portion and forming a depression inverted relative to the first-named depression for reception therein of the electroluminescent plate, and an outwardly extending flange at the lower edge of said second wall for positioning the dial in the instrument housing, whereby said indicia member serves to house the indicator or finger wheel and the electroluminescent plate, the latter in insulated relation, to diffuse the light emanating from the plate, to afford diverse diffusion of the light for purposes of distinctive illumination respectively of the indicia-bearing portion and the indicator, and to position the several elements of the dial.

Yet another object of the invention is to provide an illuminative dial as aforesaid including means for effecting electric supply to the electroluminescent plate outside of the field to be illuminated, thereby to preserve the integrity of lighting.

An additional object of the invention is the provision of an improved illuminative dial as above defined wherein the electroluminescent plate includes an outwardly extending terminal tab for accommodating electrical connections thereto exteriorly of the illuminative field, and the said indicia member has a slot in the said second or outer wall and the outer flange thereof for passage of the terminal tab of the plate, the slotted portion of the indicia member engaging the terminal tab and thereby locating the plate within the indicia member and retaining the same in insulated spaced relation to the other components of the instrument to prevent grounding of the plate. In the case of telephone dials, the electroluminescent plate and the indicia member are further provided with slots or openings for passage of the telephone finger stop, the plate locating slot and terminal tab serve to space the plate from the stop, and the three components of the dial and the stop are thereby retained in fixed relation to one another.

Other objects and advantages of the invention will become apparent in the following detailed description.

Now, in order to acquaint those skilled in the art with the manner of making and using the improved illuminative dial of our invention, we shall describe, in connection with the accompanying drawings, a preferred embodiment of our dial and a preferred manner of making and using the same.

In the drawings:

FIGURE 1 is a plan view of a telephone dial mechanism embodying a preferred embodiment of the invention;

FIGURE 2 is a sectional view of the dial mechanism taken substantially on line 2—2 of FIGURE 1;

FIGURE 3 is a fragmentary sectional view, taken substantially on line 3—3 of FIGURE 1, showing the manner in which the finger stop projects through the illuminative dial elements:

FIGURE 4 is an exploded perspective view of the elements comprising the preferred embodiment of the illuminative dial of the invention; and FIGURE 5 is a radial section, on an enlarged scale, of the illuminative dial of the invention, the elements of the dial being shown in heavy lines and the illumination thereof in relatively light lines.

Referring now to the drawings, we have shown a preferred form of our invention embodied in a telephone dial of the general character disclosed in design Patent No. 179,674, issued February 12, 1959, to Berting et al., which patent is assigned to the assignee of this application. The dial includes a dialing mechanism indicated generally at 10, which is disclosed in detail in the patent to Lloyd Bender, No. 2,834,837, issued May 13, 1938, also signed to the assignee of this application. Suffice it to state herein that the mechanism includes a housing 12 to be disposed within the telephone case and having an upwardly facing radial flange 14, an upwardly facing embossed portion 16, a relatively small diameter enclosure 18 for the dial spring, and a rotary shaft 20 which is adapted to extend through an aperture in a wall of the instrument case. The instrument case is shown in phantom lines in FIGURE 2, indicated at 22, and for the illustrated embodiment of the dial, the aperture therein would be circular and of relatively large diameter. It will be appreciated, however, that the configuration of the opening and the outer periphery of the dial may be varied as desired.

Associated with the dial mechanism 10 is an annular indicia member 24 fitting conformably in the aperture in the instrument case, a finger wheel 26 overlying the indicia member, and a finger stop 28 overlying the wheel, all as is conventional except in the respects hereinafter specifically discussed. Also as is conventional, the indicia member 24 is fastened to the embossed portion 16 of the mechanism housing by three screws, one of which is indicated at 30; the finger wheel 26 is provided with ten finger holes 32 and is fixed to the shaft 20; and the finger stop 28 is secured to the flange 14 and projects upwardly through the indicia member outwardly of the finger wheel and then inwardly over the wheel. Other conventional indicia, wheel and stop arrangements may with equal facility be adapted to the purposes of the invention, as will become apparent from the following description.

According to the present invention, in its preferred embodiment, the indicia member 24 and the finger wheel 26 are both light-transmitting, the finger wheel preferably being transparent and the indicia member preferably being translucent. For purposes of illumination, we employ an electroluminescent cell in the form of a flat plate 34 disposed between the indicia member 24 and the flange 14 of the dial mechanism housing. In the illustrated embodiment, the plate is annular and of an outer diameter only slightly less than the outer diameter of the indicia member, and of an inner diameter slightly greater than the inner diameter of the indicia member and the outer diameter of the embossed portion 16 of the mechanism housing. As a rule, the plate is of substantially the same configuration as and generally coextensive with the area to be illuminated, which area according to preferred embodiments of the invention is substantially the full area of the indicia member. The construction of the plate, as previously described herein, is well-known in the art. If the rigid backing member of the plate 34 is formed of insulating material, the plate may rest directly on the flange 14 of the mechanism housing 12, and if it is not, we provide an insulating member or disc 36 between the mechanism housing and the plate. In the present embodiment of the invention, the insulating disc is annular and has an inner diameter equal approximately to the outer diameter of the embossed portion 16 of the mechanism housing to be fitted conformably thereabout and to rest on buttons or protuberances 38 raised from the surface of the flange 14. As shown, the disc need be of a size no greater, or at least not significantly greater, than the flange 14.

The indicia member 24 in its preferred embodiment is formed of translucent insulating material, such as a variety of known plastics, and includes an essentially flat central or internal portion 40, an upstanding wall 42 bounding the portion 40, a flange 44 extending outwardly from the upper edge of the wall 42, a second wall 46 extending from the outer edge of the flange 44 downwardly beyond the planes of the central portion 42 and the plate 34, and an outwardly extending flange 48 at the lower edge of the wall 46. In the dial as illustrated, the central portion and the two flanges are annular, and the two walls are cylindrical and concentric with one another and the shaft 20 of the dial mechanism. The inner diameter of the outer wall 46 is slightly greater than the outer diameter of the electroluminescent plate 34, whereby the plate may fit within the outer wall and be engaged by the central portion of the indicia member 24 to be insulatedly housed by that member, and the insulating disc 36 if necessary. When the indicia member is secured to the housing 12 of the dial mechanism 10, the plate 34, and its insulating disc 36, are confined between the flange 14 of the housing and the indicia member thereby to be secured to the dial mechanism. Since the plate 34 fits conformably within the cylinder defined by the outer wall 46 of the indicia member, it is thereby retained at its inner edge in spaced relation to the mechanism housing 12 to be insulated therefrom.

In the resultant structure, the electroluminescent plate 34 is adapted to illuminate substantially the entirety of the indicia member 24, and especially the central portion 40, wall 42 and flange 44 thereof. To maintain the integrity of the illuminated field, we provide for connection of the power leads to the plate exteriorly of the field. Specifically, we provide integrally with the plate a radially outwardly extending terminal tab 50 to which leads 51 are connected. The leads 51 supply alternating current to the plate from a source, indicated at 52, which source is derived from the source that supplies the instrument, i.e., in the case of a telephone, the line current of the telephone distribution system; or which source may be a local alternating current source or derived from a local alternating current source. Also, a suitable control means 53 is preferably incorporated in the circuit of the plate 34 to accommodate variation in the intensity of illumination, the said means preferably including a control knob projecting to the exterior of the telephone or instrument case for manual adjustment by the user. A more detailed disclosure of the power supply circuit for a telephone dial as disclosed herein may be found in the copending application of Edward E. Bauman, Serial No. 35,534, filed June 13, 1960, now Patent Number 3,093,414, which is assigned to the assignee of this application.

In addition to preserving the integrity of the field of illumination, the terminal tab 50 constitutes means for properly locating the electroluminescent plate 34 relative to the indicia member and for maintaining the two in fixed relation. In particular, the tab 50 extends radially outward through a slot 54 in the outer wall 46 and flange 48 of the indicia member, which slot is of a size conformably to receive the tab and thereby retain the tab and the plate against movement (rotation) relative to the indicia member.

Such retention of the plate is particularly advantageous in a telephone dial of the type wherein a metal finger stop, the stop 28, extends through the plate to the exterior of the dial, as it provides means whereby the plate may be retained in insulated spaced relation from the stop. Specifically, the electroluminescent plate is provided with a radial slot 56 which is of a width greater than the finger stop to accommodate free passage therethrough of the stop. The indicia member 24 is also provided with a slot or passage 58 that is aligned with the slot 56 in the plate. In this case, however, the slot is of a width only slightly greater than the width of the finger stop, so that the indicia member serves, by virtue of its connection with the tab 50, to center the stop, the plate and the indicia member relative to one another to space the plate from the stop, as shown particularly in FIGURE 3. To preserve the integrity of the dial and the illumination thereof, the slot 56 is no wider than necessary and the passage 58 is in the form preferably of a relatively small generally vertical aperture through the inner wall 42 of the indicia member. The insulating disc 36, if provided, is slotted similarly to the plate 34, whereby it too is retained against relative rotation by the finger stop.

The finger wheel 26 is of a diameter to fit conformably, yet freely, within the cylindrical recess defined by the inner wall 42 of the indicia member 24, whereby the indicia member serves as a housing for the wheel as well as an insulated housing for the electroluminescent plate 34. The resultant structure constitutes a completely flush dial arrangement, in that the wheel 26 is substantially flush with the inner edge portion of the flange 44 of the indicia member and the outer edge portion of said flange is substantially flush with the surrounding surface of the instrument case 22 as is depicted in FIGURE 2, the flange 48 serving to position the indicia member relative to the instrument case. If desired, the flange 44 may be substantially coplanar with the face of the instrument case, or may be inclined inwardly upward therefrom, as shown herein, to provide in effect a slightly raised dial without loss of the advantages of a flush arrangement.

The instrument case 22 forms an opaque boundary about the transluent indicia member 24; and at the central portion of the dial, opaque masking is provided in the form of the usual wheel washers 60, the wheel-mounting washer 62, the trim ring 64 and the telephone number card 66, whereby the illuminative field is restricted to an annular area comprising substantially the entirety of, but no more than, the area of the indicia member.

When the electroluminescent plate 34 is energized, it illuminates the entirety of the indicia member. A particular feature of the present invention is that the central portion 40 of the indica member is essentially translucent or light-transmitting so that substantially the whole surface thereof will glow as a consequence of the illumination thereof by the plate 34 and the diffusion by the indicia member of the light emanating from the plate. However, this does not mean that the central portion need be entirely free of indicia or opaque matter. In fact, it is preferred that an opaque dot 68 or the like be provided on the central portion 40 in axial alignment with each finger hole in the wheel 26 when the wheel is in its normal position, as is shown in FIGURE 1. It is of course apparent that other or additional indicia or opaque matter may be provided if desired. Likewise, the inner wall 42 of the indicia member is preferably light-transmitting, thereby to define an illuminated well or recess for reception of the finger wheel.

The finger wheel 26 is preferably light-transmitting and, as previously noted, is transparent in the preferred embodiment of the invention. For the purposes of the invention, the wheel may be formed of a rigid, long-wearing, transparent plastic; Tennite and Lucite for example. Alternatively, an opaque wheel may be used if desired, in which case each finger hole in the wheel is very clearly defined over the illuminated background provided by the essentially translucent central portion 40 of the indicia member. This creates a very pleasing appearance and greatly facilitates the selection of the number to be dialed. However, the use of an opaque wheel does diminish the visible area of illumination. In its preferred transparent form, the wheel takes on the same hue as the central background area and does not diminish the available light, thereby to afford a most pleasing appearance aesthetically and to accommodate maximum utilization of the electroluminescent plate for illuminative purposes. The effect is further striking aesthetically in that the wheel per se is not, or is just barely distinguishable over the illuminated background, and yet each finger hole therein is clearly outlined on this background. As previously noted, depending upon the viewer's angle of incidence, portions of the wheel margins about the holes will appear to sparkle or be brightly illuminated over the background, as though edge-lighted, which effect is depicted for purposes of distinctive illustration in FIGURE 5, while other portions of the hole margins appear to be shaded. Irrespective of the cause of this phenomenon, it remains that each hole is clearly outlined over the illuminated background to facilitate selection of the number to be dialed. Moreover, the provision of a transparent or translucent finger wheel results in the provision of an illuminated background over which the finger stop 28 is clearly visible, thereby to afford illumination for all visible elements of the dial structure. The use of a transparent wheel affords the further advantage that it is compatible with instrument cases of all colors, thereby to avoid the manufacture, stocking and assembly of a variety of wheels or indicators and the problems attendant thereto.

The flange 44 of the indicia member 24 may or may not serve as an indicia-bearing or decorative surface, and may or may not be essentially translucent or light-transmitting, as desired. In the preferred embodiment of the dial, the flange serves as the primary indicia-bearing surface of the dial and is essentially translucent. To this end, the flange carries opaque indicia 70, which in a telephone dial comprise the conventional dial letters and numbers grouped in the usual manner adjacent the normal position of the respective finger holes 32. We prefer to apply the indicia 70 to the inner surface of the flange 44 so that the same are not subject to wear during use of the telephone. However, if desired, the indicia may be applied to the exterior surface portion of the flange or, as in the illustrated manner of providing the indicia 68, may extend entirely through the flange. While we prefer in a telephone dial to employ an essentially translucent flange with opaque indicia thereon, it is to be appreciated that the flange may be rendered opaque in such manner as to define translucent or transparent indicia thereon. This will decrease the illuminative capability of the dial, which may be in some cases advantageous, without diminishing the illumination of the finger wheel and the finger stop.

Due to the spacing of the indicia-bearing flange 44 from the electroluminescent plate 34, the flange tends to be illuminated to a slightly lesser degree than the central portion of the indicia member, and to be distinguished at least to a degree therefrom by its relatively dull glow as compared particularly to the sheen in the central portion resulting from the polished surface of the transparent finger wheel. This further assists in distinctive illumination of various portions or parts of the dial, and results in clear distinctive illumination of the indicia on the flange, whether the flange be essentially translucent with opaque indicia or essentially opaque with translucent indicia.

From the foregoing, it is to be appreciated that the present invention provides a highly simplified illuminative dial comprised essentially of three parts and providing for optimum illumination of all components of the dial and such additional components of the associated instrument as may be desired. The illumination afforded, while preferably controllable by the user, facilitates location, observation and use of the instrument in the dark, and also provides a landmark in a dark room to assist the occupant in finding his or her way about. The dial especially provides for distinctive illumination of the indicator or indicators of the instrument in a most pleasing manner, and the indicia member thereof serves as a housing for both the indicator and the electroluminescent plate. The objects and advantages of the invention have thus been shown herein to be achieved in a convenient, economical and practical manner.

While we have shown and described what we regard to be the preferred embodiment of our invention, it will be appreciated that various changes, rearrangements and modifications may be made therein without departing from the scope of the invention, as defined by the appended claims.

We claim:

1. An illuminative telephone dial comprising a generally annular electroluminescent plate, an annular indicia member generally coextensive with and overlying said plate, said indicia member being formed of a light transmitting insulating material and including an essentially translucent annular central portion through which substantially the entirety thereof light is adapted to pass from said plate, said translucent portion engaging said plate, an upstanding cylindrical wall bounding said central portion, an annular flange extending outwardly from said wall and a second cylindrical wall concentric with the first-named wall and extending from the outer edge of said flange downwardly beyond the plane of said central portion, said second wall having an inner diameter greater than the outer diameter of said plate and receiving said plate therein, said plate including a radially outwardly extending terminal tab for connection thereto of electric power leads exteriorly of the field of said indicia member, said second wall having a slot therein of a width equal approximately to the width of said terminal tab for accommodating passage therethrough of the tab and for interlocking said plate and said indicia member, a transparent finger wheel rotatable within the cylindrical recess defined by the first-named wall in overlying relation to said central portion of said indicia member, and said finger wheel having finger openings therein the marginal edges of which are outlined above the illuminative background of said indicia member.

2. In a telephone having a case including an apertured face for reception of a dial and a dialing mechanism including a mechanism housing in the case and a rotary shaft extending through the aperture in said face, an illuminative dial for the dialing mechanism comprising a number member fitted comformably in the aperture in the case, said member including a first portion extending inwardly from the margin of the said aperture and terminating in a circular inner edge concentric with the shaft of the dialing mechanism, a cylindrical wall portion concentric with the shaft and extending downwardly from the inner edge of said first portion and an annular central portion extending inwardly from said cylindrical wall portion above the dial mechanism housing, a finger wheel secured to said shaft and fitting conformably within said cylindrical wall portion above said central portion, an electroluminescent plate generally coextensive with said number member within the interior of the case, at least said central portion of said number member essentially being capable of transmitting light through substantially the entirety thereof, said number member carrying opaque matter for defining indicia thereon, said finger wheel being transparent and having finger openings therein, said electroluminescent plate when energized transmitting light through the portions of said number member not rendered opaque by the aforesaid opaque matter for illuminating said number member and said finger wheel and for causing the indicia and the margins of the wheel about each finger hole to be distinctively outlined, and a finger stop extending over said wheel and outlined thereover by virtue of the illuminative background provided by said number member and said plate.

3. In a telephone having a case including an apertured face for reception of dial and a dialing mechanism including a mechanism housing within the case and a rotary shaft extending through the aperture in said face, an illuminative dial for the dialing mechanism comprising a number member complementing the aperture in the face of the case and fitted conformably therein, said member including a first portion extending inwardly from the margin of the said aperture and terminating in a circular inner edge concentric with the shaft of the dialing mechanism, a cylindrical wall concentric with the shaft extending downwardly from the inner edge of said first portion and a substantially flat annular central portion extending inwardly from said cylindrical wall above the dial mechanism housing, a finger wheel secured to said shaft and fitting conformably within said cylindrical wall above said central portion, a flat electroluminescent plate generally coextensive with said number member disposed adjacent said central portion between said central portion and the mechanism housing, means for insulating said electroluminescent plate from said dial mechanism, said number member being essentially translucent so that light is adapted to pass through substantially the entirety thereof and carrying opaque matter for defining indicia thereon, said finger wheel being transparent and having finger openings therein, said electroluminescent plate when energized transmitting light through the portions of said number member not rendered opaque by the aforesaid opaque matter for illuminating said number member and said finger wheel and for causing the indicia and the margins of the wheel about each finger hole to be distinctively outlined, and a finger stop extending over said wheel and outlined thereover by virtue of the illuminative background provided by said number member.

4. An illuminative telephone dial comprising a generally annular electroluminescent plate, an annular indicia member generally coextensive with and overlying said plate, said indicia member being formed of a light transmitting insulating material and including an essentially translucent annular central portion through which substantially the entirety thereof light is adapted to pass from said plate, said translucent portion engaging said plate, an upstanding cylindrical wall bounding said central portion, an annular flange extending outwardly from said wall and a second cylindrical wall concentric with the first-named wall and extending from the outer edge of said flange downwardly beyond the plane of said central portion, said second wall having an inner diameter greater than the outer diameter of said plate and receiving said plate therein, a transparent finger wheel rotatable within the cylindrical recess defined by the first-named wall in overlying relation to said central portion of said indicia member, and said finger wheel having finger openings therein the marginal edges of which are outlined above the illuminative background of said indicia member.

References Cited in the file of this patent

UNITED STATES PATENTS

| | | |
|---|---|---|
| 2,195,672 | Gerrells | Apr. 2, 1940 |
| 2,644,861 | Jouban | July 7, 1953 |
| 2,716,298 | Speilmann et al. | Aug. 30, 1955 |
| 2,861,537 | Kadlec | Nov. 25, 1958 |
| 2,908,806 | Cohen | Oct. 13, 1959 |
| 2,988,631 | Hersey et al. | June 13, 1961 |

OTHER REFERENCES

Ser. No. 290,868, Wormser (A.P.C.), published May 18, 1943.